United States Patent
Arora

(10) Patent No.: US 11,704,665 B2
(45) Date of Patent: *Jul. 18, 2023

(54) METHOD AND SYSTEM FOR OFFLINE DATA TRANSFER VIA MACHINE-READABLE CODE

(71) Applicant: MASTERCARD INTERNATIONAL INCORPORATED, Purchase, NY (US)

(72) Inventor: Ankur Arora, New Delhi (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 88 days.

This patent is subject to a terminal disclaimer.

(21) Appl. No.: 17/450,350

(22) Filed: Oct. 8, 2021

(65) Prior Publication Data

US 2022/0027904 A1  Jan. 27, 2022

Related U.S. Application Data

(63) Continuation of application No. 15/468,347, filed on Mar. 24, 2017, now Pat. No. 11,157,900.

(51) Int. Cl.
*G06Q 20/38* (2012.01)
*H04L 9/08* (2006.01)
(Continued)

(52) U.S. Cl.
CPC ....... *G06Q 20/3829* (2013.01); *G06K 7/1417* (2013.01); *G06Q 20/065* (2013.01);
(Continued)

(58) Field of Classification Search
CPC .......... G06Q 20/3829; G06Q 20/1417; G06Q 20/065; G06Q 20/3825; G06Q 20/40975;
(Continued)

(56) References Cited

U.S. PATENT DOCUMENTS

2015/0046337 A1  2/2015  Hu et al.
2015/0371224 A1  12/2015  Lingappa
(Continued)

FOREIGN PATENT DOCUMENTS

JP        2016200954 A       12/2016

OTHER PUBLICATIONS

Office Action (Communication pursuant to Article 94(3) EPC) dated Jun. 24, 2021, by the European Patent Office in corresponding European Patent Application No. 18 710 965.7-1213. (7 pages).
(Continued)

*Primary Examiner* — Steven S Kim
*Assistant Examiner* — Zesheng Xiao
(74) *Attorney, Agent, or Firm* — Panitch Schwarze, Belisario & Nadel LLP

(57) ABSTRACT

A method for offline transmission of blockchain details includes: storing, in a computing device, a first private key and a currency amount; receiving a first destination address associated with a blockchain network and a transaction amount; generating a second private key; generating a second destination address associated with the blockchain network using the second private key; generating a blockchain transaction including at least the first destination address, the transaction amount, the second destination address, and a remainder amount based on at least the currency amount and the transaction amount; signing the generated blockchain transaction using the first private key; executing a query to replace the first private key with the second private key, wherein replacement of the first private key includes deletion of the first private key from the computing device; and transmitting the generated blockchain transaction.

19 Claims, 6 Drawing Sheets

(51) Int. Cl.
  *H04L 9/14* (2006.01)
  *H04L 9/30* (2006.01)
  *H04L 9/32* (2006.01)
  *G06Q 20/06* (2012.01)
  *G06K 7/14* (2006.01)
  *G06Q 20/40* (2012.01)
  *H04L 9/06* (2006.01)

(52) U.S. Cl.
  CPC ... *G06Q 20/3825* (2013.01); *G06Q 20/40975* (2013.01); *H04L 9/0637* (2013.01); *H04L 9/0861* (2013.01); *H04L 9/14* (2013.01); *H04L 9/30* (2013.01); *H04L 9/3247* (2013.01); *G06Q 2220/00* (2013.01)

(58) Field of Classification Search
  CPC .............. G06Q 2220/00; G06K 7/1417; H04L 9/0637; H04L 9/861; H04L 9/14; H04L 9/30; H04L 9/3247
  See application file for complete search history.

(56) References Cited

U.S. PATENT DOCUMENTS

| | | |
|---|---|---|
| 2016/0085955 A1 | 3/2016 | Lerner |
| 2016/0125403 A1 | 5/2016 | Hu et al. |
| 2016/0180338 A1 | 6/2016 | Androulaki et al. |
| 2017/0236121 A1 | 8/2017 | Lyons et al. |

OTHER PUBLICATIONS

Consensys, UTXO, 2016, medium.com, archived Mar. 4, 2020 (Year: 2016).

Cryptocompare, Bitcoin Transaction Inputs and Outputs?, 2015, cryptocompare.com, archived Mar. 4, 2020 (Year: 2015).

Jameson Lopp, The Challenges of Optimizing Unspent Output Selection, 2015, blog.lopp.net, archived Mar. 4, 2020 (Year: 2015).

Office Action (Notification of Reasons for Refusal) dated Dec. 22, 2020, by the Japanese Patent Office in corresponding Japanese Patent Application No. 2019-551956 and an English Translation of the Office Action. (5 pages).

Office Action (Notification of Reason for Refusal) dated Jan. 12, 2021, by the Korean Intellectual Property Office in corresponding Korean Patent Application No. 10-2019-7029294 and an English Translation of the Office Action. (13 pages).

Notification of Transmittal of the International Search Report and the Written Opinion of the International Searching Authority (Forms PCT/ISA/220, PCT/ISA/210 and PCT/ISA/237) dtaed Apr. 24, 2018, by the European Patent Office in corresponding International Application No. PCT/US2018/019876. (14 pages).

Pedro, "Understanding Bitcoin: Cryptography, Engineering, and Economics", Oct. 1, 2014, pp. 1-291, John Wiley & Sons Ltd., The Atrium, Southern Gate, Chichester, West Sussex, United Kingdom.

Stackexchange, Does a new private key is generated at each transaction?, 2017, stackexchange.com, archived Mar. 4, 2020 (Year: 2017).

METHOD AND SYSTEM FOR OFFLINE DATA TRANSFER VIA MACHINE-READABLE CODE

FIELD

The present disclosure relates to the offline transmission of data, specifically the transmission of data related to a blockchain transaction between two offline computing devices, which may be accomplished via the use of machine-readable code.

BACKGROUND

As computing technology and protocols have improved, computing devices have seen more and more use in the storage and transfer of data. In some cases, computing devices have begun to be used for the conducting of electronic transactions that are performed via the transmission of data, such as using a blockchain. In many instances, a computing device may have a private key associated therewith that is used to generate data related to electronic transactions and other data transfers involving the device.

However, in some cases where an electronic transaction may involve the transfer of data, a computing device may require an active internet connection or other type of connection to a related processing network or system. For example, blockchain transactions require an active connection to a blockchain network for the transaction to be processed. In such cases, if the device lacks an active connection to the network, the device may continue to attempt to transact with other devices while lacking available funds or other criteria for processing. As a result, many electronic data transfer systems prohibit the ability to transfer data without an active internet or other type of network connection.

Thus, there is a need for a technological solution to enable data transfers from one computing device to another without an active network connection that may prohibit misuse of data.

SUMMARY

The present disclosure provides a description of systems and methods for offline transmissions of blockchain details. A computing device has a private key that is used to digitally sign a blockchain transaction to initiate the transfer of funds or other type of electronic transaction from one blockchain address to another. Following the generation of the signature, the private key is deleted from the device, such that it cannot be used to sign another transaction until the transaction has been processed, which requires an active connection to the blockchain network. However, deletion of the private key without other action may relinquish the ability to access any other currency associated with the private key. As a result, a second private key is generated by the computing device and any remaining currency or other data transferred to an address associated with the second private key, to ensure that such access is retained even through deletion of the first private key, while still prohibiting additional transactions without the initial transaction being successfully processed.

A method for offline transmission of blockchain details includes: storing, in a memory of a computing device, at least a first private key and a currency amount; receiving, by a receiving device of the computing device, at least a first destination address associated with a blockchain network and a transaction amount; generating, by a generation module of the computing device, a second private key using a key generation algorithm; generating, by the generation module of the computing device, a second destination address associated with the blockchain network using the second private key; generating, by the generation module of the computing device, a blockchain transaction including at least the first destination address, the transaction amount, the second destination address, and a remainder amount based on at least the currency amount and the transaction amount; signing, by a signing module of the computing device, the generated blockchain transaction using the first private key; executing, by a querying module of the computing device, a query on the memory to replace the first private key with the second private key, wherein replacement of the first private key includes deletion of the first private key from the computing device; and electronically transmitting, by a transmitting device of the computing device, the generated blockchain transaction.

A system for offline transmission of blockchain details includes: a memory of a computing device configured to store at least a first private key and a currency amount; a receiving device of the computing device configured to receive at least a first destination address associated with a blockchain network and a transaction amount; a generation module of the computing device configured to generate a second private key using a key generation algorithm, a second destination address associated with the blockchain network using the second private key, and a blockchain transaction including at least the first destination address, the transaction amount, the second destination address, and a remainder amount based on at least the currency amount and the transaction amount; a signing module of the computing device configured to sign the generated blockchain transaction using the first private key; a querying module of the computing device configured to execute a query on the memory to replace the first private key with the second private key, wherein replacement of the first private key includes deletion of the first private key from the computing device; and a transmitting device of the computing device configured to electronically transmit the generated blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Offline Transmission of Blockchain Transaction Data

Figure 1:
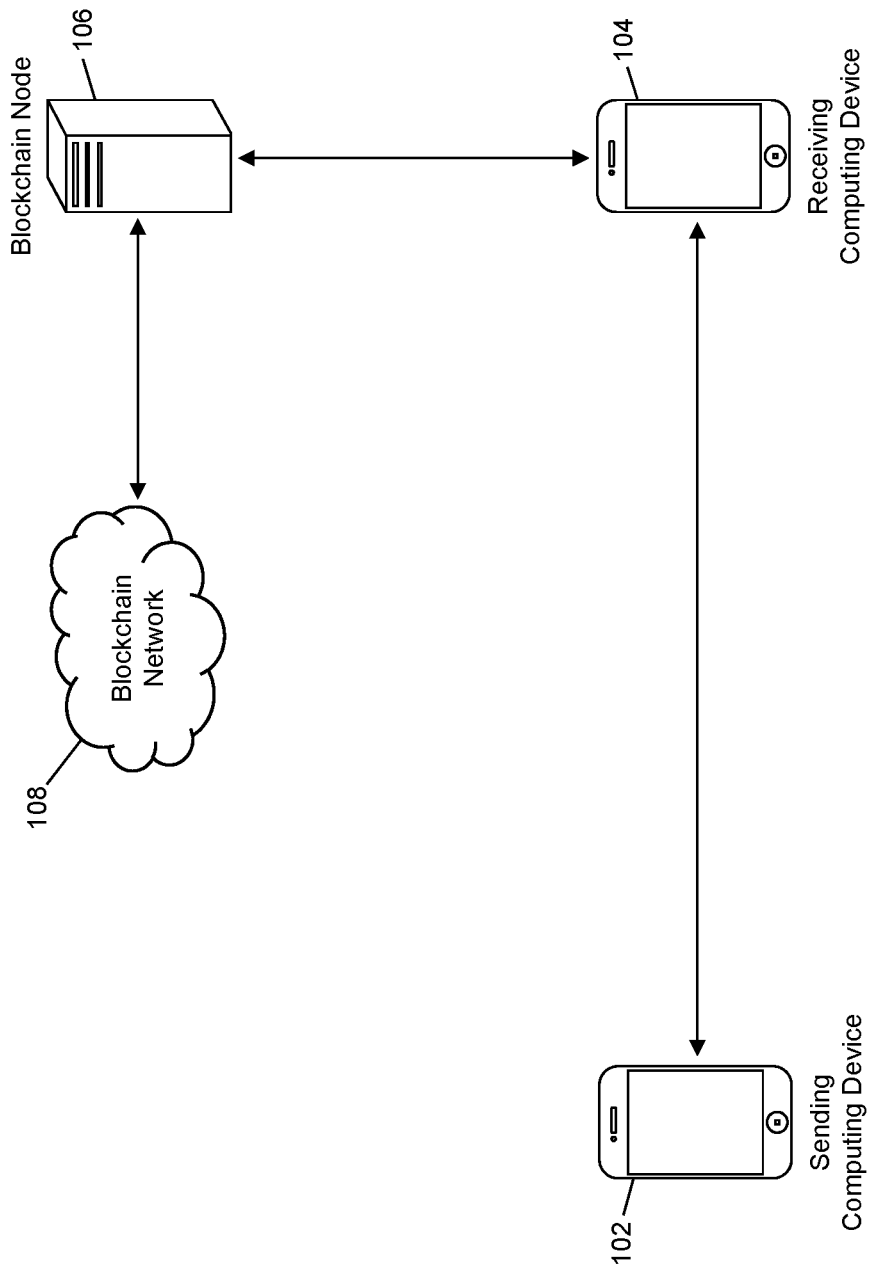
FIG. 1 is a block diagram illustrating a high level system architecture for the offline transfer of data for a blockchain transaction in accordance with exemplary embodiments.

FIG. 1 illustrates a system 100 for the transmission of data related to a blockchain transaction for successful processing without the use of an active network connection at the time of transmission.

The system 100 may include a sending computing device 102. The sending computing device 102, discussed in more detail below, may be a specifically configured computing device that is configured to transmit data related to a blockchain transaction to a receiving computing device 104, which can be accomplished without the use of an active connection to a blockchain network 108 associated therewith by the sending computing device 102 or the receiving computing device 104. The sending computing device 102 may be any type of computing device that may be specifically configured to perform the functions discussed herein, including being configured to execute digital messaging and conversation application programs and digital payment application programs, such as a specifically configured desktop computer, laptop computer, notebook computer, tablet computer, cellular phone, smart phone, smart watch, smart television, wearable computing device, implantable computing device, etc. The receiving computing device 104 may be a similar computing device or other type of computing device specially configured to perform the functions discussed herein.

The sending computing device 102 may have a private key associated with the blockchain network 108 stored therein, referred to herein as a first private key. The first private key may be part of a key pair where there is a corresponding public key, referred to herein as a first public key, distributed to the blockchain network 108 and/or other computing devices (e.g., the receiving computing device 104) used for verification of data generated via the first private key. The first private key may be used to generate digital signatures that are verified (e.g., via the corresponding first public key) and used to show possession of data (e.g., currency) associated with a blockchain address in the blockchain network 108. In some embodiments, blockchain addresses may be generated using the first private key.

In the system 100, the blockchain network 108 may be comprised of a plurality of blockchain nodes 106, where each blockchain node 106 is configured to generate blocks that are verified by other blockchain nodes 106 for addition to the blockchain associated with the blockchain network 108, which may be publicly accessible or accessible by other entities or devices (e.g., the sending computing device 102 and receiving computing device 104) via the blockchain nodes 106. The blockchain may be comprised of a plurality of blocks. Each block may be comprised of a block header and one or more transaction values. The block header may include at least a reference to a previous block, a timestamp, and a reference to the one or more transaction values included in the block. In an exemplary embodiment, the references may be hash values generated via the hashing of the corresponding data. For instance, the reference to a previous block may be a hash value generated via hashing of the block header of the most recently added block prior to addition of that block (e.g., identified via timestamp), and the reference to the transaction values may be a hash value generated via hashing of the transaction values. In some instances, the reference of the transaction values may be a Merkle root of a Merkle tree generated using the transaction values. The use of the references may ensure that the blockchain is immutable, as the change in even a single transaction value throughout the blockchain would be revealed since the Merkle root in that block header would be different, which, in turn, would result in the reference included in the block header of every subsequent block being different.

Each of the transaction values included in blocks in the blockchain network may correspond to a blockchain transaction conducted via the blockchain network 108. A transaction value may include at least a sending address from which currency assigned to that address is transferred, one or more receiving addresses and amounts being transferred thereto, and a digital signature generated for the transaction by the private key associated with the sending address. In cases where there are multiple receiving addresses, one of the receiving addresses may be associated with the private key associated with the sending address, such as for the receipt of a remainder of the transaction. For instance, if a sender is sending 100 units of currency to a recipient from an address that has 150 units associated therewith, the transaction may be accomplished via transferring 100 of the units to the recipient and the other 50 units to a new address associated with the sender, such that it retains usage of the extra 50 units.

A user of the sending computing device 102 and a user of the receiving computing device 104 may agree on an electronic transaction to be conducted via the blockchain network 108. In an exemplary embodiment, the receiving computing device 104 may not have an active connection to the blockchain network 108, or, in some instances, may lack an active internet connection, at the time of data transfer between the sending computing device 102 and the receiving computing device 104. The users of each of the computing devices may decide on a transaction amount to be transferred from the user of the sending computing device 102 (e.g., controlled by the first private key via its association with a sending address in possession of currency in the blockchain network) to the user of the receiving computing device 104 (e.g., to an address associated with a private key stored in the receiving computing device 104).

The transaction amount to be transferred may be entered into the sending computing device 102, such as via an input device interfaced therewith and accessed by the user thereof. A destination address for the currency may also be supplied to the sending computing device 102. In some embodiments, the destination address may be manually entered, such as by the user of the sending computing device 102 via the interfaced input device. In other embodiments, the receiving computing device 104 may electronically transmit the destination address to the sending computing device 102 via a suitable communication method, such as Bluetooth, near field communication, a local area network, radio frequency, display of a machine-readable code read by the sending computing device 102, etc.

Prior to generation of the blockchain transaction details, the sending computing device 102 may generate a new key pair that is comprised of a new private key and a new corresponding public key, referred to herein as a second private key and second public key. The sending computing device 102 may generate another blockchain address for receiving of currency in the blockchain transaction, referred to herein as a remainder address, using the second private key. The sending computing device 102 can then generate the transaction value for the blockchain transaction, which includes the sending address, the destination address and amount being transferred thereto, and the remainder address and a remainder amount being transferred thereto, where the remainder amount is based on the amount of currency available to the sending address and the amount being sent to the destination address (e.g., the available amount minus the amount being transferred). The sending computing device 102 may digitally sign the transaction value using the first private key, which may sign the transaction value using a suitable digital signature generation algorithm. The sending computing device 102 may then delete the private key from the sending computing device 102.

The first private key may be deleted such that no new transactions may be conducted using addresses associated therewith. Because the devices are not actively connected to the blockchain network 108 at the time of the data transfer, the transaction may not be immediately processed, which may provide the opportunity for the destination address to be submitted in multiple transactions. As a result, deletion of the first private key may ensure that no abuse of the lack of active connection to the blockchain network 108 may be performed. The sending computing device 102 may store the second private key in the sending computing device 102 in place of the first private key. As the remainder of the transaction is being transferred to an address controlled by the second private key, the sending computing device 102 may, in some embodiments, continue to be used for blockchain transactions absent an active connection to the blockchain network 108, as the remainder amount will be available to the address associated with the second private key. In some cases, the sending computing device 102 may be configured to prevent usage of the second private key for additional transactions until the initial transaction is processed by the blockchain network 108 and added to the blockchain, such as to ensure a second transaction is not processed (e.g., or attempted to be processed) prior to processing of the initial transaction.

Once the sending computing device 102 has generated and digitally signed the transaction value, the sending computing device 102 may electronically transmit the signed transaction value to the receiving computing device 104. In some embodiments, the sending computing device 102 may generate a machine-readable code, such as a bar code or quick response code, which is encoded with the signed transaction value. The receiving computing device 104 may include an optical imager, which may read the machine-readable code and decode the signed transaction value therefrom. In other embodiments, the sending computing device 102 may electronically transmit the signed transaction value to the receiving computing device 104, such as via near field communication, Bluetooth, radio frequency, local area network, etc.

The receiving computing device 104 may receive the signed transaction value. The receiving computing device 104 may then proceed to upload the signed transaction value to a blockchain node 106 in the blockchain network 108 the next time an active connection to the blockchain network 108 is established. In some embodiments, the sending computing device 102 may also electronically transmit the first public key to the receiving computing device 104. In such embodiments, the receiving computing device 104 may verify the digital signature on the transaction value using the first public key, or may provide the first public key to the blockchain node 106 with the signed transaction value, for use in verifying the digital signature.

Once the blockchain node 106 receives the signed transaction value, the blockchain node 106 may verify the digital signature and add the transaction value to other transaction values for inclusion in a new block. The block may be generated and then verified by other blockchain nodes 106 in the blockchain network 108 using traditional methods associated therewith, and then added to the blockchain. The sending computing device 102 may then be free to use the second private key in future blockchain transactions. In some embodiments, the sending computing device 102 may be configured to require an active connection to the blockchain network 108 to verify that the transaction has been processed prior to making the second private key available for use in a subsequent blockchain transaction.

The methods and systems discussed herein enable a sending computing device 102 to participate in an offline blockchain transaction where neither computing device has an active connection to the blockchain network 108. The deletion of the first private key provides a guarantee that the offline status of the sending computing device 102 cannot be abused by attempting additional transactions with the same currency before the initial transaction is processed. In addition, the use of a second private key ensures that the sending computing device 102 is not surrendering possession and/or access to any currency due to loss of the first private key. As a result, an offline blockchain transaction may be conducted that is protected from abuse as well as loss of access to currency.

Sending Computing Device

Figure 2:
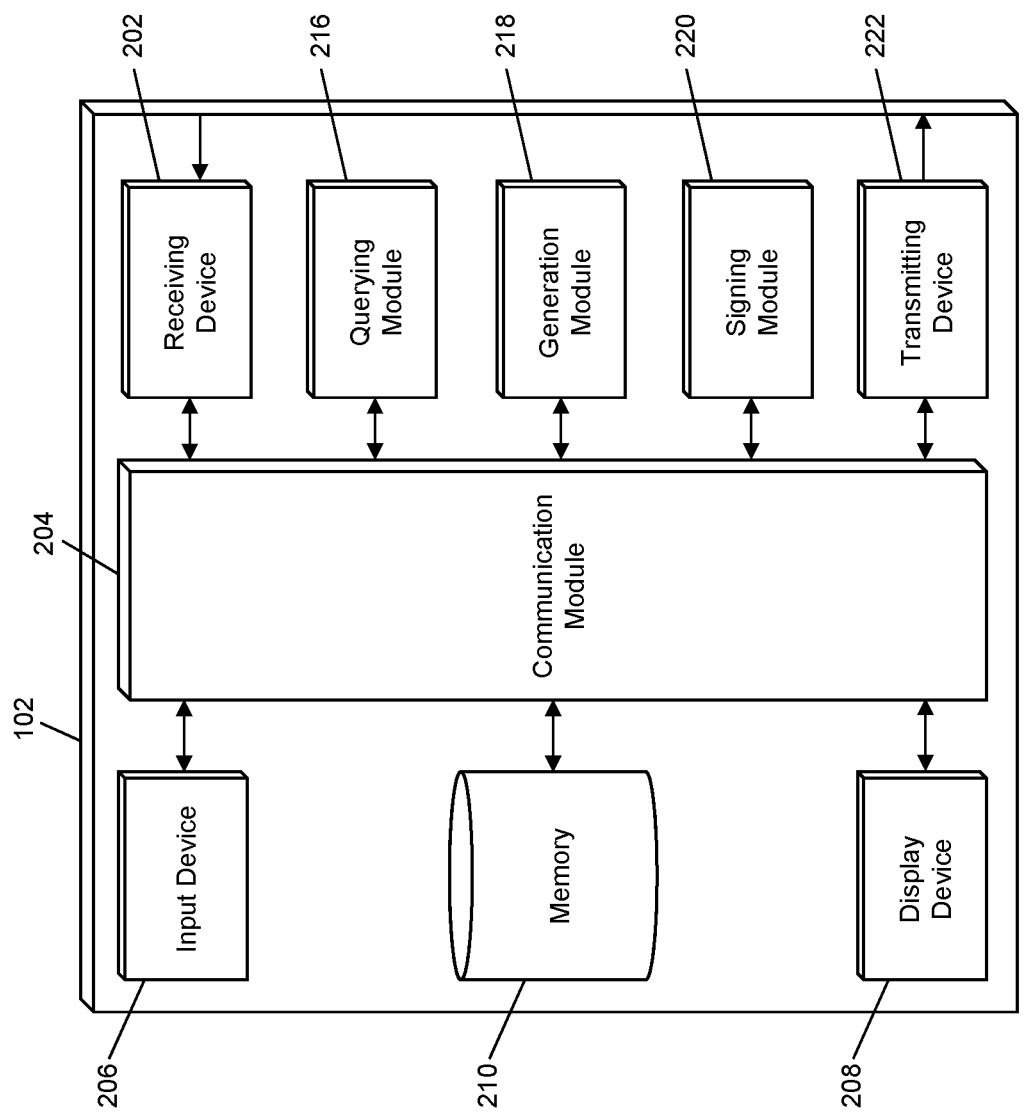
FIG. 2 is a block diagram illustrating the computing device of the system of FIG. 1 for the offline transfer of data for a blockchain transaction in accordance with exemplary embodiments.

FIG. 2 illustrates an embodiment of a sending computing device 102 in the system 100. It will be apparent to persons having skill in the relevant art that the embodiment of the sending computing device 102 illustrated in FIG. 2 is provided as illustration only and may not be exhaustive to all possible configurations of the sending computing device 102 suitable for performing the functions as discussed herein. For example, the computer system 500 illustrated in FIG. 5 and discussed in more detail below may be a suitable configuration of the sending computing device 102.

The sending computing device 102 may include a receiving device 202. The receiving device 202 may be configured to receive data over one or more networks via one or more network protocols. In some instances, the receiving device 202 may be configured to receive data from receiving computing devices 104, blockchain networks 108, and other systems and entities via one or more communication methods, such as near field communication, physical contact points, local area networks, radio frequency, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by receiving computing devices 104, which may be superimposed or otherwise encoded with a destination address, such as for the receipt of currency being transferred from the sending computing device 102. The receiving device 202 may also be configured to receive data from blockchain networks 108 (e.g., via blockchain nodes 106 thereof), which may be superimposed or otherwise encoded with blockchain data, such as blocks added to the blockchain for verification by the sending computing device 102 that an offline transaction has been processed.

The sending computing device 102 may also include a communication module 204. The communication module 204 may be configured to transmit data between modules, engines, databases, memories, and other components of the sending computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the sending computing device 102 and external components of the sending computing device 102, such as externally connected databases, display devices, input devices, etc. The sending computing device 102 may also include a processing device. The processing device may be configured to perform the functions of the sending computing device 102 discussed herein as will be apparent to persons having skill in the relevant art. In some embodiments, the processing device may include and/or be comprised of a plurality of engines and/or modules specially configured to perform one or more functions of the processing device, such as a querying module 216, generation module 218, signing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The sending computing device 102 may also include a memory 210. The memory 210 may be configured to store data for use by the sending computing device 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the sending computing device 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store a first private key of a first key pair and the corresponding first public key. The memory 210 may also be configured to store a second private key of a second key pair, which may replace the first private key following usage of the first private key for an offline blockchain transaction, such that the first private key is deleted from the memory 210 and any other storage in the sending computing device 102. The memory 210 may also store key generation algorithms, signing algorithms, and any other algorithms or other data used in performing the functions of the sending computing device 102.

The sending computing device 102 may also include or be otherwise interfaced with one or more input devices 206. The input devices 206 may be internal to the sending computing device 102 or external to the sending computing device 102 and connected thereto via one or more connections (e.g., wired or wireless) for the transmission of data to and/or from. The input devices 206 may be configured to receive input from a user of the sending computing device 102, which may be provided to another module or engine of the sending computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive input of a currency amount to be transferred and a destination address for receipt of the transferred currency.

The sending computing device 102 may also include or be otherwise interfaced with a display device 208. The display device 208 may be internal to the sending computing device 102 or external to the sending computing device 102 and connected thereto via one or more connections (e.g., wired or wireless) for the transmission of data to and/or from. The display device 208 may be configured to display data to a user of the sending computing device 102. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the sending computing device 102 may include multiple display devices 208. The display device 208 may be configured to, for example, display a machine-readable code that is encoded with a signed transaction value for the offline blockchain transaction, for reading by the receiving computing device 104 for transmission of the signed transaction value thereto.

The sending computing device 102 may include a querying module 216. The querying module 216 may be configured to execute queries on databases to identify information. The querying module 216 may receive one or more data values or query strings, and may execute a query string based thereon on an indicated database, such as the memory, to identify information stored therein. The querying module 216 may then output the identified information to an appropriate engine or module of the sending computing device 102 as necessary. The querying module 216 may, for example, execute a query on the memory 210 to identify a first private key for use in generating a digital signature, execute a query on the memory 210 to delete the first private key for replacement with a second private key, etc.

The sending computing device 102 may also include a generation module 218. The generation module 218 may be configured to generate data for use in performing the functions of the sending computing device 102 as discussed herein. The generation module 218 may receive an instruction as input, may generate data based on the instruction, and may output the generated data to another module or engine of the sending computing device 102. For example, the generation module 218 may be configured to generate blockchain addresses using private keys, generate private keys and/or key pairs including private keys, and generate blockchain transaction values for offline blockchain transactions.

The sending computing device 102 may also include a signing module 220. The signing module 220 may be configured to generate digital signatures for use in performing the functions of the sending computing device 102 as discussed herein. The signing module 220 may receive data to be signed as input, may generate a digital signature for the data using a suitable digital signature generation algorithm, and may output the digital signature to another module or engine of the sending computing device 102. For example, the signing module 220 may be configured to generate a digital signature for a blockchain transaction value using a first private key. In some instances, the first private key may be provided with the input to the signing module 220. In other instances, the first private key may be identified by the signing module 220, such as via the submission of an instruction to the querying module 216 to execute a query on the memory 210 for identification of the first private key.

The sending computing device 102 may also include a transmitting device 222. The transmitting device 222 may be configured to transmit data over one or more networks via one or more network protocols. In some instances, the transmitting device 222 may be configured to transmit data to receiving computing devices 104, blockchain networks 108, and other entities via one or more communication methods, such as near field communication, physical contact points, local area network, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to receiving computing devices 104, which may be superimposed or otherwise encoded with a signed blockchain transaction value. The transmitting device 222 may also be configured to electronically transmit data signals to blockchain networks 108, such as to request blockchain data for use in verifying the processing of an offline blockchain transaction.

Process for Offline Blockchain Transactions

Figure 3A:
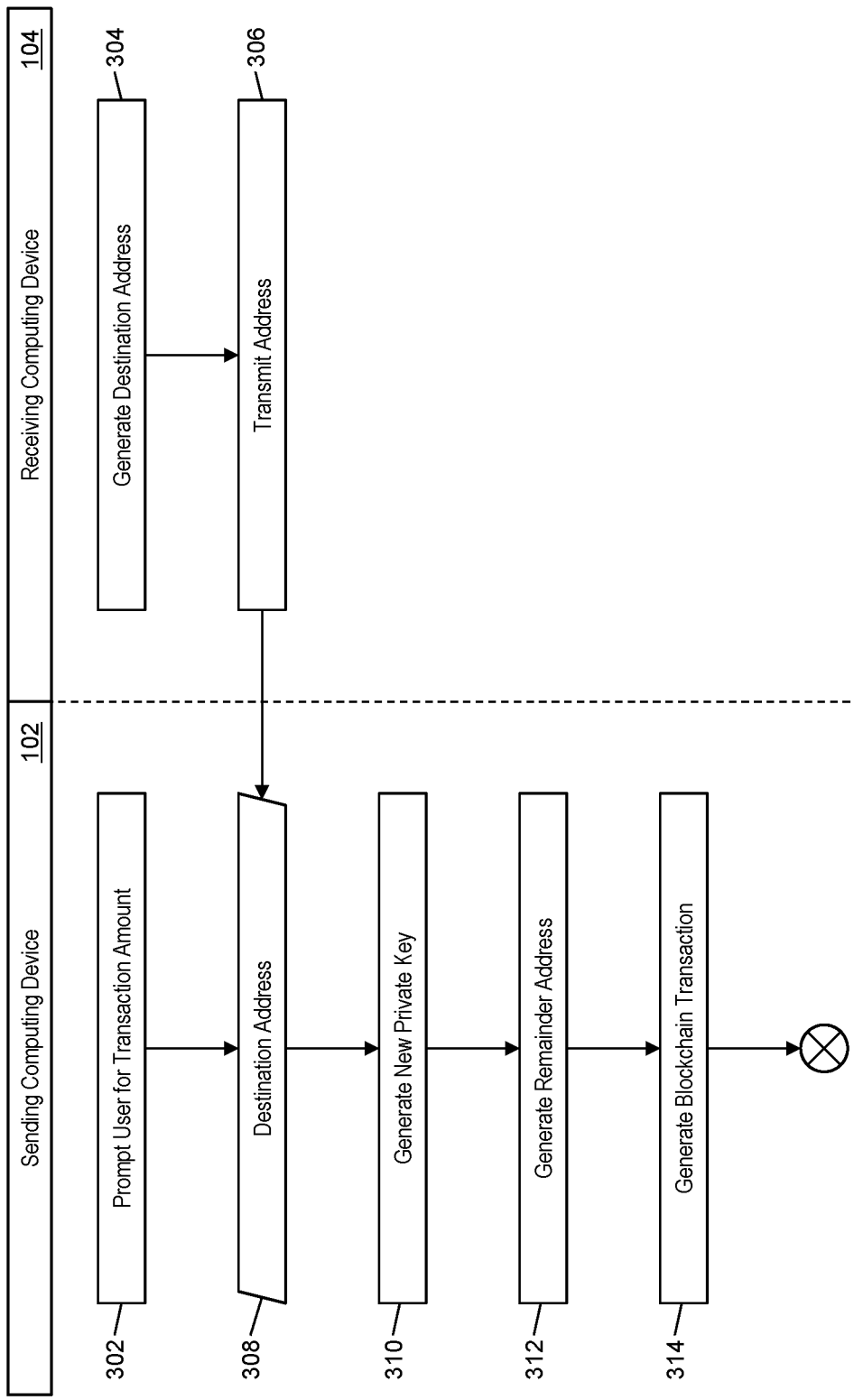
FIGS. 3A and 3B are a flow diagram illustrating a process for the offline transfer of data for a blockchain transaction using the system of FIG. 1 in accordance with exemplary embodiments.
Figure 3B:
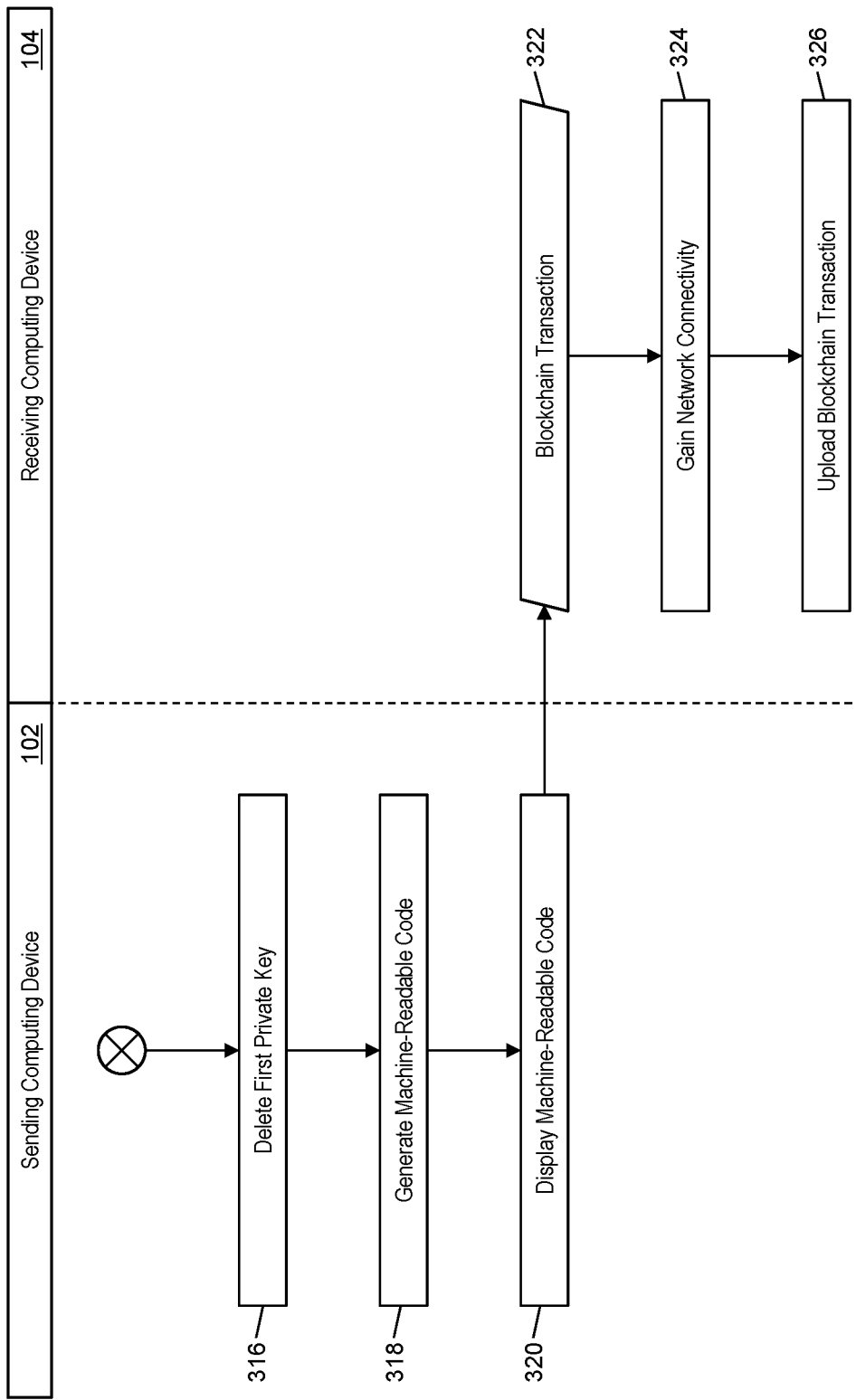

FIGS. 3A and 3B illustrate a process for the transfer of data for an offline blockchain transaction between the sending computing device 102 and receiving computing device 104 of the system 100.

In step 302, the display device 208 of the sending computing device 102 may display a prompt to a user of the sending computing device 102 to supply a transaction amount for the offline blockchain transaction, which may be supplied to the sending computing device 102 by an input device 206 interfaced therewith. In step 304, the receiving computing device 104 may generate a destination address, which may be a blockchain address of the blockchain network 108 for the receipt of the currency as part of the offline blockchain transaction. In step 306, the receiving computing device 104 may electronically transmit the destination address to the sending computing device 102. In step 308, the sending computing device 102 may receive the destination address, such as via the receiving device 202, the reading of a machine-readable code by the input device 206, or other suitable method.

In step 310, the generation module 218 of the sending computing device 102 may generate a second private key using a suitable key generation algorithm. In step 312, the generation module 218 may generate a remainder address for receipt of any remaining currency as a result of the offline blockchain transaction, which may be generated using the second private key. In step 314, the generation module 218 may generate a blockchain transaction value. The transaction value may include at least a sending address from which the currency is originating, the destination address and currency amount, and the remainder address and any remaining amount to be transferred thereto. In some cases, the signing module 220 of the sending computing device 102 may digitally sign the blockchain transaction value with the first private key using a suitable signing algorithm.

In step 316, the querying module 216 of the sending computing device 102 may execute a query on the memory 210 of the sending computing device 102 to delete the first private key stored therein. In some cases, the querying module 216 may replace the first private key in the memory 210 with the second private key. In step 318, the generation module 218 may generate a machine-readable code, such as a quick response code, that is encoded with the signed transaction value. In step 320, the display device 208 interfaced with the sending computing device 102 may display the machine-readable code.

In step 322, the receiving computing device 104 may read the machine-readable code (e.g., with a suitable optical imaging device) and decode the signed blockchain value therefrom. In step 324, the receiving computing device 104 may be taken to a location where connectivity with the blockchain network 108 is established. In step 326, the receiving computing device 104 may upload the signed blockchain transaction to a blockchain node 106 in the blockchain network 108 for verification and addition to the blockchain, which may be later verified by the sending computing device 102 once it has established network connectivity.

Exemplary Method for Offline Transmission of Blockchain Details

Figure 4:
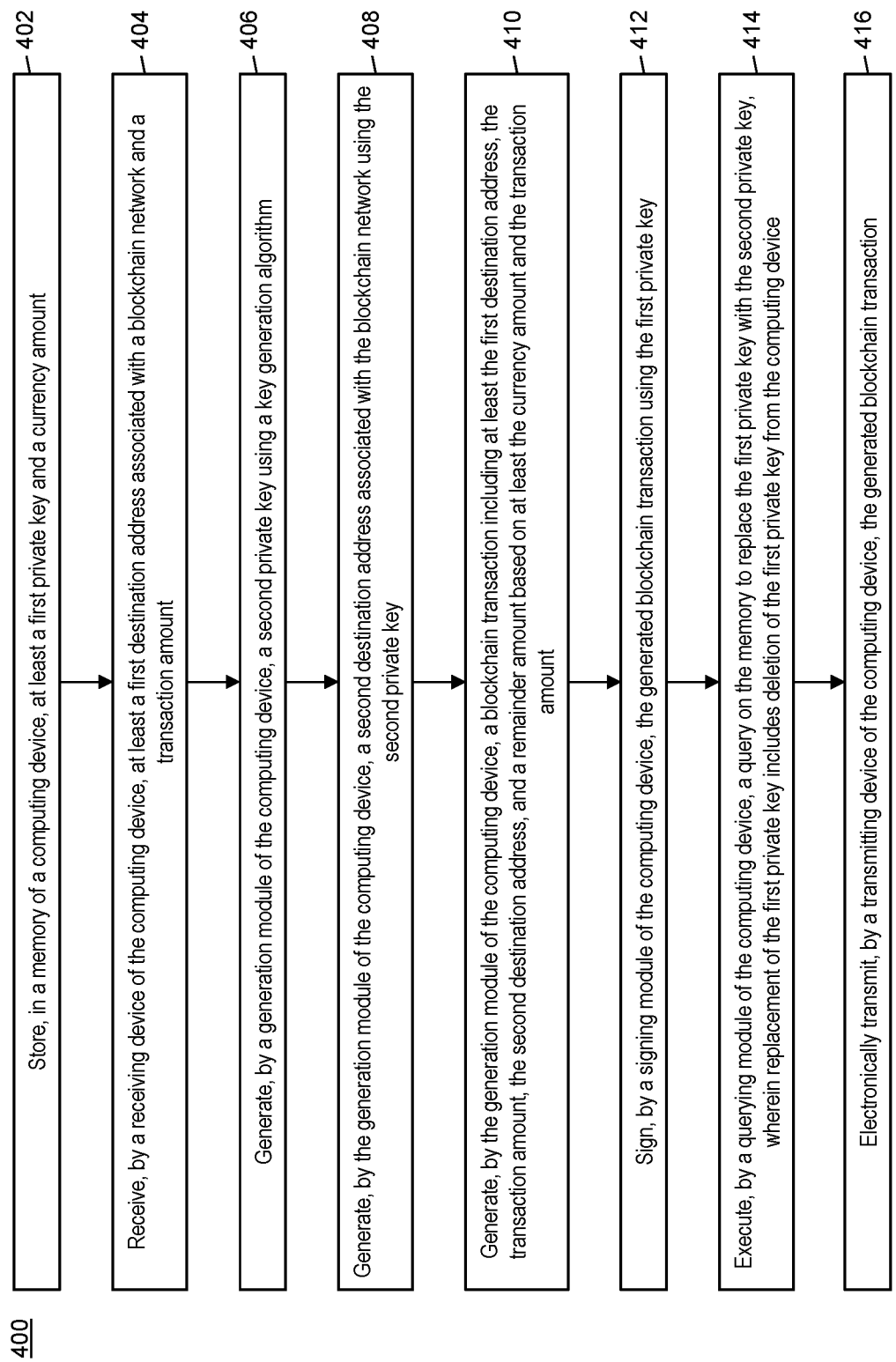
FIG. 4 is a flow chart illustrating an exemplary method for offline transmission of blockchain details in accordance with exemplary embodiments.

FIG. 4 illustrates a method 400 for the transmission of blockchain details for a blockchain transaction conducted via an offline data exchange, for uploading to a blockchain network for later processing and addition to an associated blockchain.

In step 402, at least a first private key and a currency amount may be stored in a memory (e.g., the memory 210) of a computing device (e.g., the sending computing device 102). In step 404, at least a first destination address associated with a blockchain network (e.g., the blockchain network 108) and a transaction amount may be received by a receiving device (e.g., the receiving device 202) of the computing device. In step 406, a second private key may be generated by a generation module (e.g., the generation module 218) of the computing device using a key generation algorithm. In step 408, a second destination address associated with the blockchain network may be generated by the generation module of the computing device using the second private key.

In step 410, a blockchain transaction may be generated by the generation module of the computing device, wherein the blockchain transaction includes at least the first destination address, the transaction amount, the second destination address, and a remainder amount based on at least the currency amount and the transaction amount. In step 412, the generated blockchain transaction may be signed by a signing module (e.g., the signing module 220) of the computing device using the first private key. In step 414, a query may be executed on the memory by a querying module (e.g., the querying module 216) of the computing device to replace the first private key with the second private key, wherein replacement of the first private key includes deletion of the first private key from the computing device. In step 416, the generated blockchain transaction may be electronically transmitted by a transmitting device (e.g., the transmitting device 222) of the computing device.

In one embodiment, transmitting the generated blockchain transaction may include displaying, by a display device interfaced with the computing device, a machine-readable code encoded with the generated blockchain transaction. In a further embodiment, the machine-readable code may be a quick response code. In some embodiments, the computing device may have no internet connectivity at a time of the electronic transmission of the generated blockchain transaction. In one embodiment, electronic transmission of the generated blockchain transaction may further include transmission of a public key corresponding to the first private key in a key pair.

In some embodiments, the first destination address may be received from a second computing device (e.g., the receiving computing device 104). In a further embodiment, the generated blockchain transaction may be electronically transmitted to the second computing device. In an even further embodiment, the second computing device may have no internet connectivity at a time of the electronic transmission of the generated blockchain transaction.

Computer System Architecture

Figure 5:
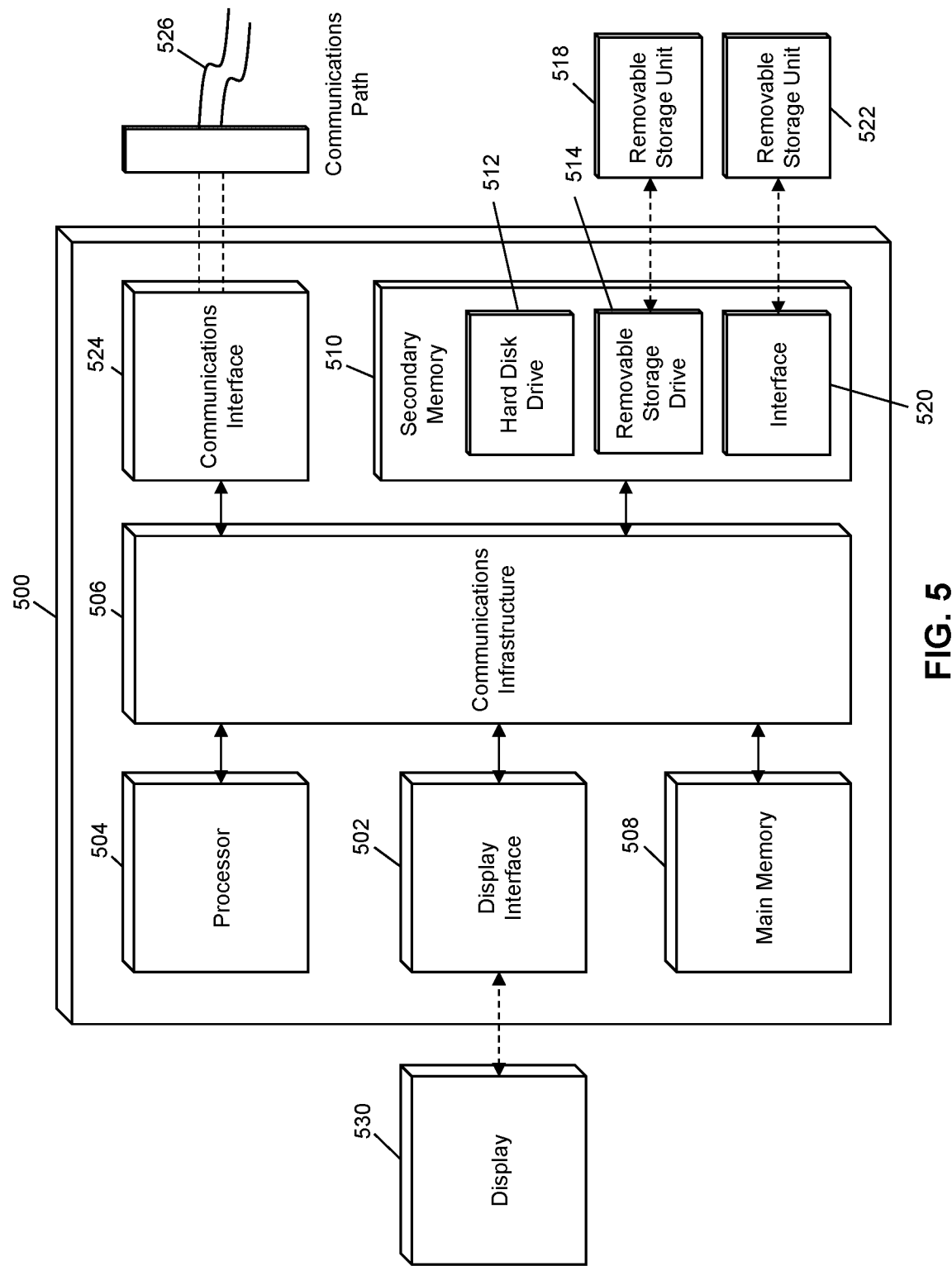
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the sending computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for offline transmission of blockchain detail. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for offline transmission of blockchain details, comprising:

storing, in a memory of a computing device, at least a first private key of a first cryptographic key pair and a currency amount;

receiving, by a receiving device of the computing device, at least a first destination address associated with a blockchain network and a transaction amount;

generating, by the generation module of the computing device, a second destination address associated with the blockchain network based on a second cryptographic key pair;

generating, by the generation module of the computing device, a blockchain transaction including at least the first destination address, the transaction amount, the second destination address, and a remainder amount based on at least a difference of the currency amount and the transaction amount;

storing, in the memory of the computing device, a second private key of the second cryptographic key pair in place of the first private key, which is deleted from the computing device; and electronically transmitting, by a transmitting device of the computing device, the generated blockchain transaction.

2. The method of claim 1, comprising:
generating, by a generation module of the computing device, the second cryptographic key pair using a key generation algorithm.

3. The method of claim 1, comprising:
signing, by a signing module of the computing device, the generated blockchain transaction using the first private key.

4. The method of claim 1, wherein storing the second private key in the memory, comprises:
executing, by a querying module of the computing device, a query on the memory to replace the first private key with the second private key.

5. The method of claim 1, wherein transmitting the generated blockchain transaction includes displaying, by a display device interfaced with the computing device, a machine-readable code encoded with the generated blockchain transaction.

6. The method of claim 1, wherein the computing device has no internet connectivity at a time of the electronic transmission of the generated blockchain transaction.

7. The method of claim 1, wherein the first destination address is received from a second computing device.

8. The method of claim 7, wherein the generated blockchain transaction is electronically transmitted to the second computing device.

9. The method of claim 8, wherein the second computing device has no internet connectivity at a time of the electronic transmission of the generated blockchain transaction.

10. A system for offline transmission of blockchain details, comprising:
a memory of a computing device storing at least a first private key of a first cryptographic key pair, a currency amount, and program code; and
a processor of the computing device executing the program code stored in the memory of the computing device, the program code causing the computing device to:
receive, by a receiving device of the computing device, at least a first destination address associated with a blockchain network and a transaction amount;
generate, by a generation module of the computing device,
a second destination address associated with the blockchain network based on a second cryptographic key pair; and
a blockchain transaction including at least the first destination address, the transaction amount, the second destination address, and a remainder amount based on at least a difference of the currency amount and the transaction amount;
store, in the memory of the computing device, a second private key of the second cryptographic key pair in place of the first private key, which is deleted from the computing device;
transmit, by a transmitting device of the computing device, the generated blockchain transaction.

11. The system of claim 10, wherein the program code further causes the computing device to:
generate, by the generation module of the computing device, the second cryptographic key pair using a key generation algorithm.

12. The system of claim 10, wherein the program code further causes the computing device to:
generate, by the generation module of the computing device, the second destination address using the second private key.

13. The system of claim 10, wherein the program code further causes the computing device to:
sign, by a signing module of the computing device, the generated blockchain transaction using the first private key.

14. The system of claim 10, wherein the program code further causes the computing device to:
execute, by a querying module of the computing device, a query on the memory to replace the first private key with the second private key.

15. The system of claim 10, wherein transmitting the generated blockchain transaction includes displaying, by a display device interfaced with the computing device, a machine-readable code encoded with the generated blockchain transaction.

16. The system of claim 10, wherein the computing device has no internet connectivity at a time of the electronic transmission of the generated blockchain transaction.

17. The system of claim 10, wherein the first destination address is received from a second computing device.

18. The system of claim 17, wherein the generated blockchain transaction is electronically transmitted to the second computing device.

19. The system of claim 18, wherein the second computing device has no internet connectivity at a time of the electronic transmission of the generated blockchain transaction.

* * * * *